(12) United States Patent
Aufrichtig et al.

(10) Patent No.: US 6,792,159 B1
(45) Date of Patent: Sep. 14, 2004

(54) CORRECTION OF DEFECTIVE PIXELS IN A DETECTOR USING TEMPORAL GRADIENTS

(75) Inventors: Richard Aufrichtig, Mountain View, CA (US); Kenneth Scott Kump, Waukesha, WI (US); Ping Xue, Waukesha, WI (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 0 days.

(21) Appl. No.: 09/474,498

(22) Filed: Dec. 29, 1999

(51) Int. Cl.$^7$ ................................................ G06K 9/40
(52) U.S. Cl. .................................... 382/260; 382/275
(58) Field of Search .............................. 382/260, 284, 382/272, 275; 348/273, 247, 234; 378/207; 345/214, 55, 643, 694, 207

(56) References Cited

U.S. PATENT DOCUMENTS

| | | | |
|---|---|---|---|
| 5,047,863 A | 9/1991 | Pape et al. | 358/213.16 |
| 5,272,536 A | 12/1993 | Sudo et al. | 358/213.15 |
| 5,504,504 A * | 4/1996 | Markandey et al. | 345/214 |
| 5,657,400 A | 8/1997 | Granfors et al. | 382/254 |
| 5,719,600 A * | 2/1998 | Alcorn | 345/430 |
| 5,854,655 A | 12/1998 | Watanabe et al. | 348/247 |
| 6,271,825 B1 * | 8/2001 | Greene et al. | 345/694 |

OTHER PUBLICATIONS

Tan et al., "A Robust Sequential Approach for the Detection of Defective Pixels in an Image sensor", IEEE International Conference on Proceedings, vol. 4, Mar./1999, pps. 2239–2242.*

* cited by examiner

*Primary Examiner*—Anh Hong Do
(74) *Attorney, Agent, or Firm*—Foley & Lardner LLP

(57) ABSTRACT

A detector imaging system having an apparatus and method for correcting defective pixels in a current acquired image is disclosed herein. The system performs the correction of defective pixels using image feature information and temporal information. The system includes a correction scheme which includes determining a temporal matrix based on the current acquired image, at least one prior acquired image, and a filter weight; determining a local gradient based in part on the temporal matrix and a gradient kernel; and providing a correction value based on the local gradient to correct the defective pixel. The correction scheme is repeated a plurality of times as desired to correct all the defective pixels in the current acquired image.

50 Claims, 3 Drawing Sheets

CORRECTION OF DEFECTIVE PIXELS IN A DETECTOR USING TEMPORAL GRADIENTS

BACKGROUND OF THE INVENTION

The present invention relates generally to detector systems. More particularly, the present invention relates to a detector system equipped to correct defective pixel values therein.

A solid state detector contains a plurality of photodetector elements. For example, a radiographic x-ray detector can include several million photodetector elements to correspondingly provide an image having several million pixels. Such a detector typically comprises a scintillating layer in contact with an array of photodiodes arranged in rows and columns. Each photodiode converts impinging light into an electrical charge or signal proportional thereto, and in turn, each electrical signal is processed and converted into a digital value. The resulting array of digital valves comprise the image data for the image to be displayed.

In the course of manufacturing such a detector, a certain number of photodetector elements will invariably be defective. Because pixel size is chosen such that objects of interest in the image will be greater than the size of an individual pixel, a perfect detector is not required for imaging. However, if defective or bad pixels are aggregated in sizeable clusters, the loss of relevant information may be considerable. Alternatively, since defective pixel values would either be independent of the impinging light, because the corresponding detector locations are not photonically and/or electrically responsive, or be dependent of the impinging light but in manner statistically different from its neighboring pixels, if defective pixels are left unaltered in the displayed image, they would distract from the visualization of the rest of the image.

Presently, there are known methods for identifying and correcting defective pixel values prior to displaying the image. These correction methods replace each defective pixel value with an interpolation of its neighboring pixel values. Such correction methods, however, are quite susceptible to creating image artifacts, such as breaks in guide wires, because the correction relies only on the defective pixel's surrounding pixels, i.e., the eight pixels surrounding the defective pixel, and uses static correction schemes. Instead, by basing the correction upon temporal image content, selective neighboring pixels of each defective pixel can be utilized to avoid image artifacts, such as breaks in guide wires.

Thus, there is a need for a correction method that provides a more accurate correction of defective pixels. There is a further need for an apparatus and method configured to utilize image feature information and temporal information to perform defective pixel correction.

BRIEF SUMMARY OF THE INVENTION

One embodiment of the invention relates to a method for correcting a defective pixel in a current image produced by a detector. The current image includes an array of pixels and each element in the array of pixels has a corresponding pixel value. The method includes determining a correction value of the defective pixel in the current image based on a gradient. The gradient is comprised in part using the current image and an image produced by the detector selected from a group including at least one prior image and at least one future image.

Another embodiment of the invention relates to a system for correcting a defective pixel in a current image produced by a detector. The current image includes an array of pixels and each element in the array of pixels has a corresponding pixel value. The system includes a processor coupled to the detector. The processor is configured to determine a correction value of the defective pixel in the current image based on a gradient. The gradient is comprised in part using the current image and another image produced by the detector selected from a group including at least one prior image and at least one future image.

Still another embodiment of the invention relates to a system for correcting a defective pixel. The system includes means for producing a current image and an another image selected from a group including a prior image and a future image. The current image includes an array of pixels and each element in the array of pixels has a corresponding pixel value. The system further includes means for determining a correction value of the defective pixel in the current image. The determination of the correction value is based on a gradient, the gradient comprised in part using the current image and the another image.

BRIEF DESCRIPTION OF THE DRAWINGS

The preferred embodiment will become more fully understood from the following detailed description, taken in conjunction with the accompanying drawings, wherein like reference numerals denote like elements, in which.

DETAILED DESCRIPTION OF THE INVENTION

Figure 1:
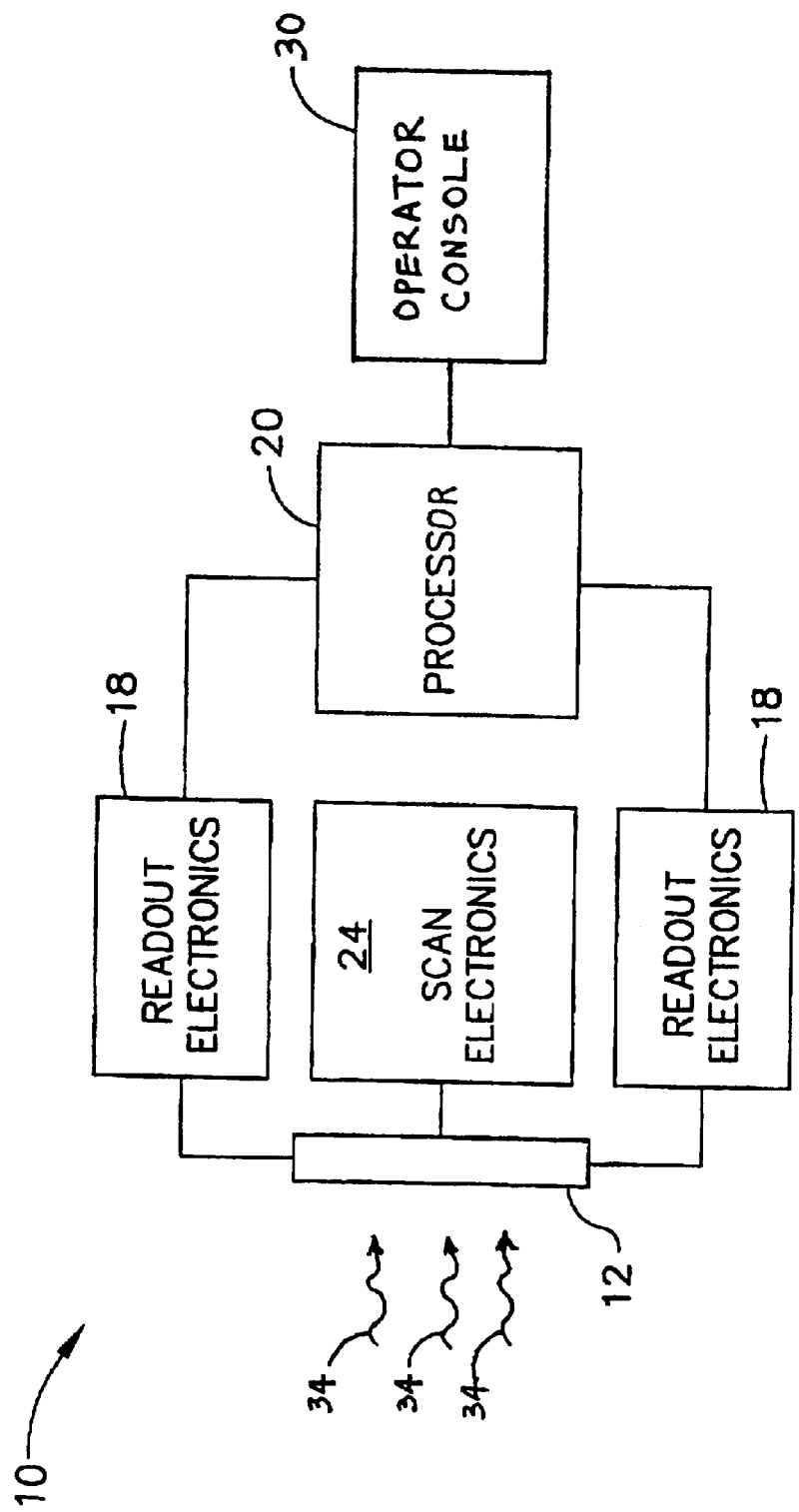
FIG. 1 is a block diagram of a solid state detector imaging system which employs an embodiment of the present invention.

Referring to FIG. 1, there is shown the major components of a solid state detector imaging system 10. System 10 includes a detector 12, readout electronics 18, scan electronics 24, a processor 20, and an operator console 30. System 10 is configured to sense photonic energy 34 impinging on the detector 12 and to display an image corresponding to the intensity of such photonic energy on a display device (CRT, LCD, etc.) of the operator console 30. Photonic energy 34 impinges on detector 12, and detector 12 outputs analog signals corresponding to the intensity or energy of photonic energy 34 to readout electronics 18. Readout electronics 18 are coupled to processor 20, and processor 20 is coupled to operator console 30. Scan electronics 24 are coupled to detector 12.

In one embodiment, system 10 is configured to be a x-ray detection imaging system. X-rays are provided by a source and travel through a collimator, to be attenuated by a subject of interest to be imaged, i.e., a patient. Then photonic energy 34 (which in this case are the attenuated x-rays) is received by detector 12 for image display (not shown).

Figure 2:
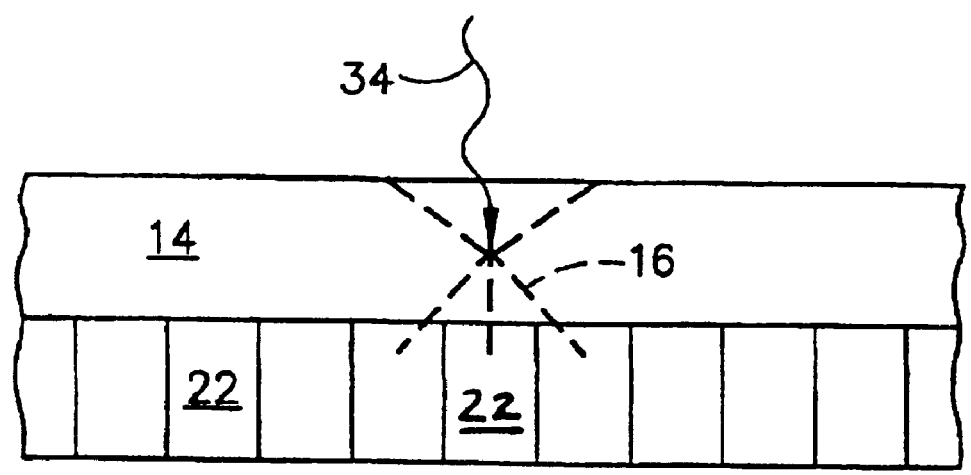
FIG. 2 is a cross-sectional view of a detector which comprises a portion of the solid state detector imaging system of FIG. 1.

Referring to FIG. 2, detector 12 includes a scintillator 14 and an array of photodetector elements 22. Scintillator 14 converts photonic energy 34 from x-rays to light 16 at wavelengths receivable by photodetector elements 22. For example, scintillator 14 may be comprised of thallium (Tl)

doped cesium iodide (CsI) that converts x-rays into visible light. Impinging light 16 is converted into an array of electrical signals by corresponding photodetector elements 22. Although not shown, detector 12 may comprise more than one detector.

Each of photodetector elements 22 includes a photodiode comprised of thin film materials, such as amorphous silicon, and a thin film field effect transistor (not shown). In this manner, each of photodetector elements 22 is configured to output an electrical signal proportional to photonic energy 34 impinging thereon to readout electronics 18 and to be controlled by scan electronics 24, such as being "reset" to acquire the next image.

The readout electronics 18 are configured to convert the array of electrical signals, i.e., analog signals, into an array of digital signals that can be processed, stored, and displayed as an image using processor 20 and operator console 30. Alternatively, the digitization of the electrical signals can occur in processor 20. Moreover, in order to reduce the amount of readout electronics 18 required in system 10, photodetector elements 22 can be configured to store the electrical signals until they can be processed by readout electronics 18.

Processor 20 is configured to provide electrical signal processing, into an image data form suitable for image display, storage, transmission to a remote site, film or print record, or other utilization and manipulations. Such processing may include performing defective pixel correction (as described in greater detail hereinafter). Operator console 30 includes various components such as a display device, a storage device, a printer, and an operator control unit (e.g., a mouse, a keyboard, a graphical user interface, etc. (not shown)) to facilitate various utilization and manipulation of the acquired image data. Alternatively, operator console 30 may be omitted and the various output modes of the acquired image data may be carried out in processor 20.

Detector 12 includes a plurality of photodetector elements 22. Depending on factors such as the type of desired imaging, resolution, cost of system, etc., detector 12 can vary in size and construction. For example, for x-ray imaging relatively large portions of the test subject, such as the patient's chest area, a 41×41 cm$^2$ active area detector can include several million photodetector elements 22 (e.g., 2048×2048 array of photodetector elements 22) with a pixel pitch of 200×200 $\mu$m$^2$. As another example, detector 12 may have a smaller active area for use in mammography and have a 100×100 $\mu$m$^2$ pixel pitch. In still another example, detector 12 may be housed inside a charge-coupled device (CCD) camera with an active area of only 2 cm$^2$.

Moreover, it should be understood that system 10 is not limited to x-ray imaging. In another embodiment, system 10 can be configured to acquire images from photonic energy 34 outside the wavelengths of x-rays. Accordingly, detector 12 may include additional components, or components such as scintillator 14 can be omitted.

Because detector 12 includes a large number of photodetector elements 22, it is not unusual for one or more photodetector elements 22 to be defective. Such photodetector elements 22 are defective because they are not responding photonically or electrically, or because they respond electrically but in a manner statistically different from other photodetector elements 22 with similarly impinged photonic energy 34. Consequently, defective photodetector elements 22 produce defective electrical signals and ultimately defective pixel values in the displayed image, if left unaltered. While it may be unpractical and expensive to refabricate defective photodetector elements 22, it is possible to correct or mask defective pixel values before the acquired image is displayed.

Before such a correction scheme is implemented, defective pixels of detector 12 are identified using one or more conventionally known methods. For example, during calibration and setup of system 10, all the defective pixels of detector 12 can be identified by analyzing known images, e.g., an image containing no structure, and searching for nonconforming or unexpected pixel values. For more details relating to identification of defective pixels, reference is made to U.S. Pat. No. 5,657,400 owned by the General Electric Company, which is incorporated herein by reference. From this identification step, n number of defective pixels can be identified for detector 12.

Figure 3:
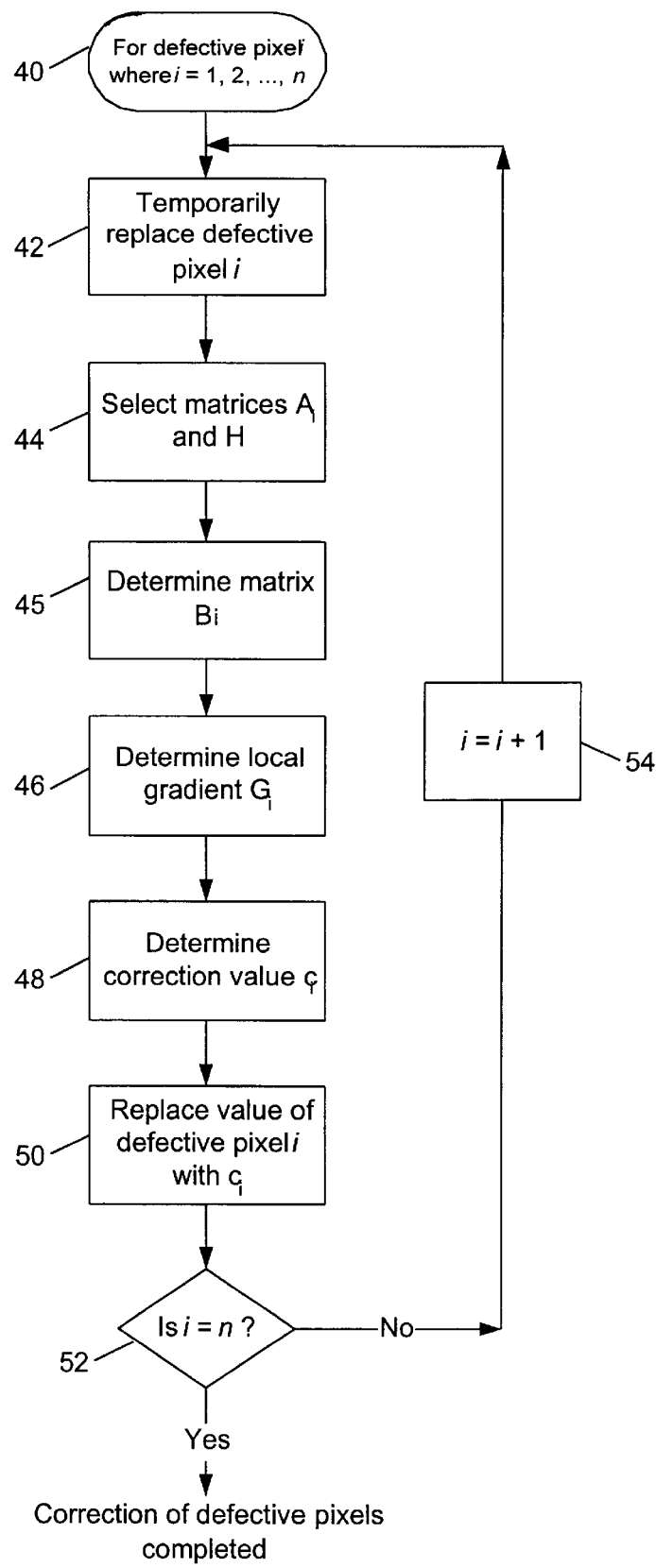
FIG. 3 is a flowchart of a defective pixel temporal correction scheme implemented in the solid state defector system of FIG. 1.

Referring to FIG. 3, there is shown a flow chart of a temporal image feature or gradient method for correcting defective pixel values. The temporal correction scheme includes a start step 40, a temporarily replace defective pixel step 42, a select matrices step 44, a determine matrix $B_i$ step 45, a determine local gradient step 46, a determine correction value step 48, a replace defective pixel value step 50, a check step 52, and an incrementor step 54. For each defective pixel i (where i=1, 2, . . . , n) in a current image acquired at a time t, steps 42–54 are carried out to provide a masking or correction thereto.

In one embodiment, the temporal correction scheme is performed in real-time such that the corrected current image can be displayed as quickly as possible after its acquisition. The temporal correction scheme preferably uses a prior image acquired using detector 12 at a time frame t−1 and the current image acquired using detector 12 at a time frame t.

In step 42, the value of defective pixel i in the current image is temporarily replaced with a linear interpolation of its surrounding neighboring pixel values. Details relating to linear interpolation are provided in U.S. Pat. No. 5,657,400, which has already been incorporated herein by reference. Alternatively, step 42 may be omitted and the correction may be performed without determining the linear interpolation of defective pixel i.

After step 42, the selection of matrices $A_i$ and H are carried out in step 44. An image matrix $A_i$ is comprised of the temporarily replaced pixel value $t_i$ (in step 42) as the center element and the ith defective pixel's surrounding neighbor pixel values as the remaining matrix elements. The image matrix $A_i$, also referred to as $A_i(t)$, is a P×Q matrix (where P is the total number of rows and Q is the total number of columns). In the case of detector 12 including 2048×2048 array of photodetector elements 22, $A_i$ can be up to a 2048×2048 matrix. Alternatively, $A_i$ can be smaller than a 2048×2048 matrix, such as a 7×7 matrix.

H is a gradient kernel matrix. In one embodiment, H is a 7×7 Laplacian of a Gaussian filter kernel defined by the values:

$$H = \begin{matrix} 0.0235 & 0.0235 & 0.0235 & 0.0235 & 0.0235 & 0.0235 & 0.0235 \\ 0.0235 & 0.0235 & 0.0256 & 0.0355 & 0.0256 & 0.0235 & 0.0235 \\ 0.0235 & 0.0256 & 0.3034 & 0.7128 & 0.3034 & 0.0256 & 0.0235 \\ 0.0235 & 0.0355 & 0.7128 & -5.0694 & 0.7128 & 0.0355 & 0.0235 \\ 0.0235 & 0.0256 & 0.3034 & 0.7128 & 0.3034 & 0.0256 & 0.0235 \\ 0.0235 & 0.0235 & 0.0256 & 0.0355 & 0.0256 & 0.0235 & 0.0235 \\ 0.0235 & 0.0235 & 0.0235 & 0.0235 & 0.0235 & 0.0235 & 0.0235 \end{matrix}$$

In another embodiment, H can be of a different matrix size, such as 11×11 or 5×5. Moreover, H can be a variety of gradient kernels, such as a Roberts, a Prewitt, or a Sobel gradient kernel.

The selection capability in step 44 provides flexibility in noise immunity vs. edge strength. The selection of matrices $A_i$ and H can be carried out in a number of ways. For example, a user of system 10 can explicitly specify the size of image matrix $A_i$ and/or the size and type of the gradient kernel matrix H. In another example, the user of system 10 can input an application type (i.e., a portion of the patient to be imaged, such as a heart or knee) or the level (i.e., the dose) of photonic energy 34 to be applied to acquire the current image. In still another example, system 10 can use image statistics (e.g., an average gradient or standard deviation of the current image) to estimate a noise level of the current image.

Typically, the dose level used to acquire an image is inversely proportional to the noise level associated with that image. For a high dose (low noise level) image acquisition, the sizes of $A_i$ and H can be relatively small. Conversely, a low dose (high noise level) image acquisition would benefit from larger sizes of $A_i$ and H. Thus, when the application type, dose, or estimated noise level is used, system 10 can include a lookup table or an equation to automatically select the appropriate sizes of $A_i$ and H. It is also contemplated that the matrix size of $A_i$ and the matrix type and size of H can be preset such that step 44 may be omitted.

In step 45, determination of a temporal matrix $B_i$ is carried out. Image matrix $A_i$ (for the ith defective pixel in the current image) is used to generate the temporal matrix $B_i$ (for the ith defective pixel in the current image). Temporal matrix $B_i$ is also a P×Q matrix. Each pixel value corresponding to a matrix element in the image matrix $A_i$, except the temporarily replaced value $t_i$ for the center matrix element, is filtered to correspondingly generate a temporally filtered pixel value in the temporal matrix $B_i$.

The pixel value $e_{i,p,q}(t)$ corresponding to a (p,q)th matrix element of the image matrix $A_i(t)$ (where p=1, 2, ..., P and q=1, 2, ..., Q, but excluding the center element containing the temporarily replaced pixel value $t_i$) is filtered to become the temporally filtered pixel value $e'_{i,p,q}(t)$ using a first order infinite impulse response (IIR) filter defined by:

$$e'_{i,p,q}(t) = k \cdot e_{i,p,q}(t) + (1-k) \cdot e'_{i,p,q}(t-1) \qquad (1)$$

where k is a temporal filter weight having a value of 0.7; $e_{i,p,q}(t)$ is the pixel value corresponding to the (p,q)th matrix element of $A_i(t)$; and $e'_{i,p,q}(t-1)$ is a temporal filter output for $e_{i,p,q}(t-1)$ or, in other words, the temporally filtered pixel value calculated from the prior image acquired at a time t−1. For the P×Q sized image matrix $A_i$, this IIR filter is evoked a total of (P·Q)−1 times (since the temporarily replaced pixel value $t_i$ for the center matrix element of $A_i$ remains untouched) to generate all the necessary terms of the temporal matrix $B_i$. Accordingly, temporal matrix $B_i$ is given by:

$$B_i = B_i(t) = \begin{vmatrix} e'_{i,1,1}(t) & e'_{i,1,2}(t) & \ldots & e'_{i,1,Q}(t) \\ \vdots & \vdots & \vdots & \vdots \\ \vdots & \vdots & t_i & \vdots \\ \vdots & \vdots & \vdots & \vdots \\ e'_{i,P,1}(t) & \ldots & \ldots & e'_{i,P,Q}(t) \end{vmatrix}.$$

Alternatively, the IIR filter may be a higher order IIR filter which includes more than one temporal filter weight k (i.e., $k_0, k_1, k_2, k_3, \ldots$) and uses temporally filtered pixel values from more than one previously acquired image (i.e., prior images acquired at time frames t−2, t−3, . . . ). For example, a second order IIR filter may be defined as:

$$e'_{i,p,q}(t) = k_0 \cdot e_{i,p,q}(t) + k_1 \cdot e'_{i,p,q}(t-1) + k_2 \cdot e'_{i,p,q}(t-2)$$

where $k_0 + k_1 + k_2 = 1$ and $0 \leq k_r \leq 1$ with r=0, 1, 2. And a Nth order IIR filter may be defined as:

$$e'_{i,p,q}(t) = k_0 \cdot e_{i,p,q}(t) + k_1 \cdot e'_{i,p,q}(t-1) + \ldots + k_N \cdot e'_{i,p,q}(t-N)$$

where $$\sum_{r=0}^{N} k_r = 1$$

and $0 \leq k_r \leq 1$ with r=0, 1, ..., N. To carry out real-time computations as fast as possible, system 10 can include dedicated hardware such as digital signal processing (DSP) chips.

Moreover, it is contemplated that the temporal filter weight k may be any value in the range between 0 to 1. For example, the value of the temporal filter weight may be selected such that the prior image could be given greater weight than the current image or to minimize temporal blurring (i.e., image blurring caused by movement of the object of interest from a previous frame to a current frame). In another example, the temporal filter weight can be selected based on the application type, dose, estimated noise level, or the frame rate (with a lookup table or an equation as similarly discussed above for step 44). When the frame rate is low (e.g., a few frames per second), the dose is high, or the noise level is low, the temporal filter weight may be closer to the value of 1. Conversely, when the frame rate is high (e.g., tens of frames per second), the dose is low, or the noise level is high, the temporal filter weight may be decreased to provide greater averaging.

After step 45, determination of a local gradient $G_i$ around temporarily replaced pixel $t_i$ is carried out in step 46. In one embodiment, $G_i$ is calculated by:

$$G_i = \sqrt{(B_i * H)^2 + (B_i * (-H))^2}.$$

For example, when $B_i$ and H are both 7×7 matrices, $G_i$ will be a 7×7 matrix. Alternatively, $G_i$ can be determined by a variety of other equations such that $G_i$ provides relative gradient information about the pixels surrounding defective pixel i (the surrounding pixels as specified by $B_i$) with respect to image features, such as a strong edge, embodied by these surrounding pixels. Thus the matrix elements of $G_i$ having the highest values, i.e., strongest gradients, correspond to pixels comprising the strongest image features for that portion of the image.

It is contemplated that the local gradient computation (i.e., step 46) and the temporal averaging (i.e., step 45) may be combined using a three-dimensional (3-D) filter to alternatively yield the local gradient. The 3-D filter includes gradient kernel and temporal averaging components to simultaneously provide noise immunity and compute the local gradient. Moreover, the 3-D filter size and the weight (s) used therein may automatically be adjusted in real-time to take into account the expected or estimated noise level, temporal blurring, or signal strength.

Using $G_i$ calculated in step 46, a correction value $c_i$ to correct defective pixel i is determined in step 48. Correction value $c_i$ is a linear average or a weighted average of the ith defective pixel's surrounding neighboring pixel values with the highest gradients and/or closest proximity to defective pixel i. Correction value $c_i$ insures that defective pixel i is replaced with image information along an image gradient, i.e. based on more global image information such as image features, instead of very local image information only. Any well-known linear averaging or weighted averaging methods can be utilized to determine $c_i$.

For example, step 48 can comprise a weighted average based on the three highest gradient pixel values within a three-pixel radius of defective pixel i. Then the pixel values corresponding to the highest gradient pixel ($g_1$), the second highest gradient pixel ($g_2$), and the third highest gradient pixel ($g_3$), would be given a weight of $g_1/(g_1+g_2+g_3)$, $g_2/(g_1+g_2+g_3)$, and $g_3/(g_1+g_2+g_3)$, respectively. Alternatively, the weights could be fixed at certain values such as 50%, 30%, and 20%, respectively. In another example, step 48 can comprise a weighted average based on the three highest gradient pixel values within a three-pixel radius of defective pixel i with greater weight given to pixels closer in location to defective pixel i. Assume that for these three highest gradient pixels, one pixel is located at each of one-pixel, two-pixel, and three-pixel radius of defective pixel i. Then the pixel values located at the one-pixel, two-pixel, and three-pixel radius of defective pixel i, respectively, would be given a weight of 50%, 30%, and 20%, respectively.

Once $c_i$ has been determined in step 48, the value of defective pixel i (actually $t_i$ from step 42) is replaced with the correction value $c_i$ in step 50. If all the defective pixels in a given image have not been corrected (i.e., i<n), then step 52 directs the defective pixel correction to be performed for the next defective pixel (i.e., i=i+1 in step 54). Otherwise if all the defective pixels in a given acquired image have been corrected (i.e., i=n), then step 52 directs the defective pixel correction process to end for this acquired image. Thus the final image, to be displayed, printed, etc., is the current acquired image with correction of its defective pixels using feature information (via local gradient $G_i$) from prior acquired images.

In another embodiment, the current image is not displayed in real-time and as such, the temporal correction scheme can utilize prior and/or future images (i.e., feature information from one or more prior frames and/or future frames relative to the current frame). For this non-real-time application, also referred to as a review application, the temporal correction scheme uses the current image acquired using detector 12 at time frame t; one or more prior images acquired using detector 12 at time frames t−1, t−2, . . . , t−$N_{prior}$; and/or one or more future images acquired using detector 12 at time frames t+1, t+2, . . . , t+$N_{future}$.

The temporal correction scheme in review application is shown in FIG. 3 and is similar to the discussion above for the real-time application except that in step 45, Equation (1) to generate the temporally filtered pixel values comprising the temporal matrix $B_i$ is replaced by an averaging temporal filter expressed as:

$$e'_{i,p,q}(t) = \sum_{r=-N_{prior}}^{N_{future}} k_r \cdot e_{i,p,q}(t+r)$$

where $N_{prior}$ is the number of prior images used; $N_{future}$ is the number of future images used; and $k_r$ are symmetrical weights, wherein $$\sum_{r=-N_{prior}}^{N_{future}} k_r = 1.$$

Preferably, $N_{prior}$=2, $N_{future}$=2, and [$k_{-2}$ $k_{-1}$ $k_0$ $k_1$ $k_2$]=[0.1 0.2 0.4 0.2 0.1].

It should be understood that depending on the desired balance between minimizing temporal blurring and noise, the values of symmetrical weights $k_r$ can be selected to place greater dependence on, for example, the (t−2)th and the (t+2)th frames rather than the (t−1)th and the (t+1)th frames.

In this manner, correction of defective pixels can be implemented using feature information and temporal information by tracking gradients in a series of prior and/or future images. For each defective pixel i in the current image, changes in the gradients of its surrounding neighboring pixels, as a function of time, are utilized to determine the correction value $c_i$. The temporal correction scheme disclosed herein provides preservation of image features and edges within a given image but also provides continuity of certain image features within a series of images.

For example, the temporal correction scheme would have application in medical procedures such as angioplasty. In angioplasty, a catheter with a balloon attached thereto is fed into the body to the site of the blocked blood vessel. During this feeding process, x-rays are used to guide the movement of the catheter through the body by providing a plurality of image frames per second. Thus, the information imparted by each of these images having defective pixels can be improved by defective pixel correction or masking using temporal gradients.

While the embodiments and application of the invention illustrated in the figures and described above are presently preferred, it should be understood that these embodiments are offered by way of example only. For example, it is contemplated that the invention may be applied to systems other than medical systems which can benefit from the use of defective pixel correction. Still further, the present invention may be implemented using hardware, software, and/or firmware. Even still further, the correction values of the defective pixels (i.e., $c_i$) can be linked with its acquired image in a variety of manner, such as permanently replacing the defective pixel:values on the acquired image or separately storing the correction values with links to the corresponding defective pixel locations. In still another example, Equation (1) used in real-time application of the temporal correction scheme may be used in a review application when the images need not be displayed immediately. Accordingly, the present invention is not limited to a particular embodiment, but extends to various modifications that nevertheless fall within the scope of the appended claims.

What is claimed is:

1. A method for correcting a defective pixel in a current image produced by a detector, the current image including an array of pixels and each element in the array of pixels having a corresponding pixel value, comprising:

(a) determining a correction value of the defective pixel in the current image based on a gradient, the gradient comprised using the current image and an image produced by the detector selected from a group including at least one prior image and at least one future image;

wherein the determining step (a) includes at least one of a linear interpolation and a weighted average of pixel values corresponding to the highest matrix elements of the gradient.

2. The method of claim 1, wherein the highest matrix elements of the gradient include at least three of the highest matrix elements, and wherein the weighted average of pixel values include placing greater weight to pixel values proximate to the defective pixel.

3. The method of claim 1, wherein
the gradient is comprised using values of the current image and values of the image produced by the detector; and
the values of the current image and values of the image produced by the detector are values associated with an image to be displayed.

4. A method for correcting a defective pixel in a current image produced by a detector, the current image including an array of pixels and each element in the array of pixels having a corresponding pixel value, comprising:
(a) determining a correction value of the defective pixel in the current image based on a gradient, the gradient comprised in part using the current image and an image produced by the detector selected from a group including at least one prior image and at least one future image; and
determining the gradient using a three-dimensional filter comprising a gradient kernel component and a temporal averaging component.

5. The method of claim 4 wherein the gradient is comprised using values of the current image and values of the image produced by the detector; and the values of the current image and values of the image produced by the detector are values associated with an image to be displayed.

6. A method for correcting a defective pixel in a current image produced by a detector, the current image including an array of pixels and each element in the array of pixels having a corresponding pixel value, comprising:
(a) determining a correction value of the defective pixel in the current image based on a gradient, the gradient comprised in part using the current image and an image produced by the detector selected from a group including at least one prior image and at least one future image;
(b) determining the gradient using a gradient kernel and a temporal matrix, the gradient being a matrix of the same size as the temporal matrix.

7. The method of claim 6, further comprising (c) determining the temporal matrix using in part an image matrix, the image matrix comprising at least a portion of the array of pixels of the current image.

8. The method of claim 7, further comprising:
specifying at least one of an application type, a dose, and an estimated noise level of the current image; and
selecting the size of at least one of the image matrix and the gradient kernel based on at least one of the application type, the dose, and the estimated noise level.

9. The method of claim 7, wherein the image matrix includes a center matrix element selected from a group including the defective pixel and a linear interpolation value of a plurality of surrounding neighboring pixels of the defective pixel, and remaining matrix elements including surrounding neighboring pixels of the defective pixel.

10. The method of claim 7, further comprising repeating the determining steps (a)–(c) a plurality of times as desired to correct each of a plurality of defective pixels in the current image.

11. The method of claim 7, wherein the determining step (c) includes determining the temporal matrix using the image matrix, each prior temporal matrix corresponding to the at least one prior image, and a filter weight.

12. The method of claim 11, wherein the determining step (c) includes determining the temporal matrix using each future temporal matrix corresponding to the at least one future image.

13. The method of claim 11, further comprising selecting the filter weight based On at least one of an application type, a dose, an estimated noise level, and a frame rate.

14. The method of claim 11, wherein the determining steps (a)–(c) occur in real-time.

15. The method of claim 7, wherein the determining step (c) includes determining the temporal matrix using the image matrix, each future temporal matrix corresponding to the at least one future image, and a filter weight.

16. The method of claim 15, further comprising selecting the filter weight based on at least one of an application type, a dose, an estimated noise level, and a frame rate.

17. The method of claim 7, further comprising:
identifying the defective pixel in the current image before the determining step (c); and
selecting the gradient kernel from a group including a Laplacian of a Gaussian filter kernel, a Roberts gradient kernel, a Prewitt gradient kernel, and a Sobel gradient kernel.

18. The method of claim 6, wherein
the gradient is comprised using values of the current image and values of the image produced by the detector; and
the values of the current image and values of the image produced by the detector are values associated with an image to be displayed.

19. A system for correcting a defective pixel in a current image produced by a detector, the current image including an array of pixels and each element in the array of pixels having a corresponding pixel value, comprising:
a processor coupled to the detector, the processor configured to determine a correction value of the defective pixel in the current image based on a gradient;
wherein the gradient is comprised using the current image and an another image produced by the detector selected from a group including at least one prior image and at least one future image; and
wherein the correction value is at least one of a linear interpolation and a weighted average of pixel values corresponding to the highest matrix elements of the gradient.

20. The system of claim 19, wherein the highest matrix elements of the gradient include at least three of the highest matrix elements, and wherein the weighted average of pixel values include placing greater weight to pixel values proximate to the defective pixel.

21. The system of claim 19, wherein the gradient is further comprised using values of the current image and values of the image produced by the detector; and the values of the current image and values of the image produced by the detector are values associated with an image to be displayed.

22. A system for correcting a defective pixel in a current image produced by a detector, the current image including an array of pixels and each element in the array of pixels having a corresponding pixel value, comprising:
a processor coupled to the detector, the processor configured to determine a correction value of the defective pixel in the current image based on a gradient;
wherein the gradient is comprised using the current image and an another image produced by the detector selected from a group including at least one prior image and at least one future image; and wherein the processor is configured to determine the gradient using a three-dimensional filter comprising a gradient kernel component and a temporal averaging component.

23. The system of claim 22, wherein the gradient is further comprised using values of the current image and values of the image produced by the detector; and the values of the current image and values of the image produced by the detector are values associated with an image to be displayed.

24. A system for correcting a defective pixel in a current image produced by a detector, the current image including an array of pixels and each element in the array of pixels having a corresponding pixel value, comprising:
a processor coupled to the detector, the processor configured to determine a correction value of the defective pixel in the current image based on a gradient;
wherein the gradient is comprised using the current image and an another image produced by the detector selected from a group including at least one prior image and at least one future image; and
wherein the processor is configured to determine the gradient using a gradient kernel and a temporal matrix, the gradient being a matrix of the same size as the temporal matrix.

25. The system of claim 24, wherein the processor is configured to determine the temporal matrix in part using an image matrix comprising at least a portion of the array of pixels of the current image.

26. The system of claim 25, wherein the size of at least one of the image matrix and the gradient kernel is selected by the processor based on at least one of an application type, a dose, and an estimated noise level of the current image.

27. The system of claim 25, wherein the image matrix includes a center matrix element selected from a group including the defective pixel and a linear interpolation value of a plurality of surrounding neighboring pixels of the defective pixel, and remaining matrix elements including surrounding neighboring pixels of the defective pixel.

28. The system of claim 25, wherein the processor is configured to determine the temporal matrix, the gradient, and the correction value for each of a plurality of defective pixels in the current image.

29. The system of claim 25, wherein the temporal matrix is determined using the image matrix, each another temporal/matrix corresponding to the another image, and at least one filter weight.

30. The system of claim 29, wherein at least one of an application type, a dose, an estimated noise level, and a frame rate is the determinant for the filter weight.

31. The system of claim 29, wherein the temporal matrix, the gradient, and the correction value are determined in real-time.

32. The system of claim 25, wherein the processor is configured to identify the defective pixel in the current image before determining the temporal matrix, and further comprising an operator console coupled to the processor and configured to accept a selection of the gradient kernel from a group including a Laplacian of a Gaussian filter kernel, a Roberts gradient kernel, a Prewitt gradient kernel, and a Sobel gradient kernel.

33. The system of claim 24, wherein the gradient is further comprised using values of the current image and values of the image produced by the detector; and the values of the current image and values of the image produced by the detector are values associated with an image to be displayed.

34. A system for correcting a defective pixel, comprising:
means for producing a current image and an another image selected from a group including a prior image and a future image, the current image including an array of pixels and each element in the array of pixels having a corresponding pixel value; and
means for determining a correction value of the defective pixel in the current image based on a gradient, the gradient comprised using the current image and the another image;
wherein the correction value is at least one of a linear interpolation and a weighted average of pixel values corresponding to the highest matrix elements of the gradient.

35. The system of claim 34, wherein the highest matrix elements of the gradient include at least three of the highest matrix elements, and wherein the weighted average of pixel values include placing greater weight to pixel values proximate to the defective pixel.

36. The system of claim 34, wherein the gradient is further comprised using values of the current image and values of the image produced by the detector; and the values of the current image and values of the image produced by the detector are values associated with an image to be displayed.

37. The system of claim 34, wherein the gradient is further comprised using values of the current image and values of the another image; and the values of the current image and values of the another image are values associated with an image to be displayed.

38. A system for correcting a defective pixel, comprising:
means for producing a current image and an another image selected from a group including a prior image and a future image, the current image including an array of pixels and each element in the array of pixels having a corresponding pixel value;
means for determining a correction value of the defective pixel in the current image based on a gradient, the gradient comprised using the current image and the another image; and
means for determining the gradient using a three-dimensional filter including a gradient kernel component and a temporal averaging component.

39. The system of claim 38, wherein the gradient is further comprised using values of the current image and values of the another image; and the values of the current image and values of the another image are values associated with an image to be displayed.

40. A system for correcting a defective pixel, comprising:
means for producing a current image and an another image selected from a group including a prior image and a future image, the current image including an array of pixels and each element in the array of pixels having a corresponding pixel value;
(a) means for determining a correction value of the defective pixel in the current image based on a gradient, the gradient comprised using the current image and the another image; and
(b) means for determining the gradient using a gradient kernel and a temporal matrix, the gradient being a matrix of the same size as the temporal matrix and the means for determining (b) coupled to the means for determining (a).

41. The system of claim 40, further comprising (c) means for determining the temporal matrix in part using an image matrix, the image matrix comprising at least a portion of the array of pixels of the current image and the means for determining (c) coupled to the means for determining (a).

42. The system of claim 41, further comprising:
means for specifying at least one of an application type, a dose, and an estimated noise level of the current image; and means for selecting the size of at least one of the image matrix and the gradient kernel based on at least one of the application type, the dose, and the estimated noise level.

43. The system of claim 41, wherein the image matrix includes a center matrix element selected from a group including the defective pixel and a linear interpolation value of a plurality of surrounding neighboring pixels of the defective pixel, and remaining matrix elements including surrounding neighboring pixels of the defective pixel.

44. The system of claim 41, further comprising (d) means for determining the temporal matrix, the gradient, and the correction value for each of a plurality of defective pixels in the current image.

45. The system of claim 41, wherein the temporal matrix is determined using the image matrix, each another temporal matrix corresponding to the another image, and at least one filter weight.

46. The system of claim 45, wherein the at least one filter weight is chosen depending on at least one of an application type, a dose, an estimate noise level, and a frame rate.

47. The system of claim 45, wherein each (p,q)th matrix element of the temporal matrix is determined using a (p,q)th matrix element of the image matrix, a (p,q)th matrix element of each another temporal matrix corresponding to the another image, and at least one filter weight.

48. The system of claim 45, wherein the temporal matrix, the gradient, and the correction value are determined in real-time.

49. The system of claim 41, further comprising means for identifying the defective pixel in the current image before determining the temporal matrix, and further comprising an operator console coupled to the processor and configured to accept a selection of the gradient kernel from a group including a Laplacian of a Gaussian filter kernel, a Roberts gradient kernel, a Prewitt gradient kernel, and a Sobel gradient kernel.

50. The system of claim 40, wherein the gradient is further comprised using values of the current image and values of the another image; and the values of the current image and values of the another image are values associated with an image to be displayed.

* * * * *